United States Patent [19]
Takara

[11] Patent Number: 5,554,903
[45] Date of Patent: Sep. 10, 1996

[54] ROTARY ELECTRIC MACHINE

[76] Inventor: Muneaki Takara, 19-20, Oroku 1-chome, Naha-shi, Okinawa, 901-01, Japan

[21] Appl. No.: 211,661

[22] PCT Filed: Oct. 14, 1992

[86] PCT No.: PCT/JP92/01334

§ 371 Date: Jun. 9, 1994

§ 102(e) Date: Jun. 9, 1994

[87] PCT Pub. No.: WO93/08634

PCT Pub. Date: Apr. 29, 1993

[30] Foreign Application Priority Data

Oct. 14, 1991 [JP] Japan ..................................... 3-296519
Aug. 21, 1992 [JP] Japan ..................................... 4-245709

[51] Int. Cl.[6] .............................. H02K 1/22; H02K 1/27
[52] U.S. Cl. ............................................ 310/266; 310/156
[58] Field of Search ................................. 310/68 B, 156, 310/162, 266, 127, 136

[56] References Cited

U.S. PATENT DOCUMENTS

| | | | |
|---|---|---|---|
| 155,237 | 9/1874 | Hochhausen | 310/266 |
| 3,396,296 | 8/1968 | Esters | 310/266 |
| 3,602,749 | 8/1971 | Esters | 310/266 |
| 4,972,112 | 11/1990 | Kim | 310/156 |
| 5,081,388 | 1/1992 | Chen | 310/266 |
| 5,089,733 | 2/1992 | Fukuoka | 310/68 B |

*Primary Examiner*—Clayton E. LaBalle
*Attorney, Agent, or Firm*—Fish & Richardson, P.C.

[57] ABSTRACT

A rotary electric machine of an inner rotor type includes a hollow stator having multiple field magnets, each having a magnetic pole, arranged in a spaced relationship along a circumferential direction on an inner surface of the stator such that all inward-facing magnetic poles of the field magnets have the same polarity. A cylindrical rotor is arranged concentrically inside the stator such that a gap separates the rotor from the stator. The rotor has multiple magnetic pole generators, each comprising a rotor winding wound on a core, arranged in a spaced relationship along a circumferential direction on a outer surface of the rotor such that the magnetic pole generators oppose, and are separated by the gap from, the field magnets on the inner surface of the stator. A commutator mechanism is arranged to alternately excite and suspend excitation of the rotor windings of the magnetic pole generators such that (A) the magnetic pole generators have a same polarity as that of the field magnets when a first repulsive force received from a field magnet on a rear side in a forward rotational direction of the rotor is greater than a second repulsive force received from another field magnet on a front side in the forward rotational direction, and (B) the magnetic pole generators have no polarity when the first repulsive force received becomes less than or equal to the second repulsive force.

3 Claims, 11 Drawing Sheets

FIG.11

ROTARY ELECTRIC MACHINE

TECHNICAL FIELD

The present invention relates to a rotary electric machine capable of being utilized as a motor and the like and, more particularly, a rotary electric machine constructed on the basis of a new operational principle, which is operated by using a magnetic repulsive force as its driving force.

BACKGROUND ART

Generally known motors, such as direct current motors, brushless direct current motors and the like, constitute a field system by a group of magnetic poles of both polarities of North magnetic poles and South magnetic poles and they are arranged to rotate a rotor by a magnetic attractive force, acting between the magnetic poles of opposite polarities of a stator and the rotor, as a major driving force.

Conventional motors constitute a field system by a group of magnetic poles of single polarity; however, there is not known a rotary electric machine based on a new operational principle that a rotor is rotated by a magnetic repulsive force acting between magnetic poles of both polarities of the rotor and a stator.

The object of this invention, however, is to provide a rotary electric machine which constitutes a field system by a group of magnetic poles of such single polarity and which is operated by utilizing a magnetic attractive force acting between magnetic poles of the same polarity of a rotor and a stator as a driving force.

DISCLOSURE OF INVENTION

In order to achieve the object as described hereinabove, a first aspect of this invention is to provide a rotary electric machine comprising a rotary electric machine of an inner rotor type, with a cylindrical rotor arranged concentrically inside a hollow stator at a distance of a gap; wherein said stator is arranged with a plurality of field magnets disposed in a spaced relationship along a circumferential direction on its surface directed to said rotor in such a manner that all magnetic poles of said field magnets on the side directed to said rotor have the same polarity; said rotor is mounted with a plurality of magnetic pole generating means comprised each of a rotor winding wound on its core, disposed along a circumferential direction on its surface directed to said stator, in a spaced relationship in accordance with the position in which said field magnet is disposed; a commutation mechanism is disposed for exciting a rotor winding of said rotor by a commutator and a brush; and said commutation mechanism is structured such that a rotor winding of said rotor is excited in the direction in which the magnetic pole of said rotor on the side directed to said field magnet generates the same polarity as that of the magnetic pole of said field magnet facing said rotor and that said rotor winding is excited at a timing when a combination of a magnetic repulsive force to be received from the field magnet disposed on the rear side in the rotational direction of said rotor with a magnetic repulsive force to be received from the field magnet disposed on the front side in the normal direction thereof turns into a force for urging the rotation of said rotor in its rotational direction, when said rotor winding is excited, because the magnetic repulsive force received from field magnet disposed on the rear side in the rotational direction of said rotor is greater than the magnetic repulsive force received from the field magnet disposed on the front side in the rotational direction thereof, and, on the other hand, that the excitation of said rotor winding is suspended at a timing when the rotation of said rotor in the normal direction is decreased because the relationship of the magnetic repulsive forces between the magnetic poles of said rotor and said field magnets is reversed.

In a second aspect, the present invention is to provide a rotary electric machine wherein, in the rotary electric machine as described hereinabove, said machine is of an outer rotor type in which said rotor is comprised of a hollow structure and said stator is disposed concentrically inside said hollow rotor at a distance of the gap, in place of the disposition of said rotor inside said stator.

In a third aspect, the present invention is to provide a rotary electric machine wherein, in the rotary electric machine in the first aspect, said rotor is comprised of a hollow structure and said stator is arranged concentrically inside said hollow rotor in a distance of the gap; the magnetic poles of said rotor on the opposite side of the magnetic poles of said rotor generated by said magnetic pole generating means are arranged to appear in the circumferential direction on the inside surface of said rotor; and said inner stator is structured such that a plurality of the field magnets are arranged in the circumferential direction on a surface facing said rotor in a spaced relationship in accordance with the position in which the inner magnetic poles of said rotor are disposed and that all the polarities of the magnetic poles of said field magnets of said inner stator on the side directed to said rotor become all the same and they become opposite to the polarities of the magnetic poles of the field magnets of the outer stator on the side directed to said rotor.

In accordance with the rotary electric machines in the first, second and third aspects of this invention, the magnetic poles having the same polarity as the field magnets of the stator is generated on the rotor by exciting the stator winding and the magnetic repulsive force acting between the magnetic poles of the rotor and the field magnets of the stator is utilized as the rotational force for rotating the rotor in the normal direction of the rotor. On the other hand, each of the magnetic poles of the rotor receives the magnetic repulsive force in the direction opposite to the direction of rotation when each of the magnetic poles of the rotor passes through the respective field magnets of the stator located ahead in the rotational direction. Hence, the excitation of the rotor winding is suspended at this timing. When the excitation of the rotor winding has been suspended, a small magnitude of the magnetic attractive force acts between the core of the rotor and the field magnets of the stator, thereby continuing the rotation of the rotor in the normal direction together with the rotational inertia.

In a fourth aspect, the present invention is to provide a rotary electric machine wherein, in the rotary electric machine in each aspect as described hereinabove, when said rotor winding is excited, the magnetic attractive force is produced as the rotational force for rotating said rotor in the normal direction by exciting said rotor winding in the reverse direction at the same timing and by allowing the magnetic attractive force to act between the magnetic poles of said rotor and the magnetic poles of said field magnets, in place of the excitation of said rotor winding being suspended at a timing when the rotation of said rotor in its normal direction is decreased because the relationship of said magnetic repulsive forces between the magnetic poles of said rotor said the magnetic poles of said field magnets is reversed.

In the rotary electric machine in the fourth aspect, when the rotor winding is excited in the reverse direction, the magnetic poles of the rotor is made opposite in polarity to the field magnets of the stator and a strong magnitude of the magnetic attractive force is caused to act between the magnetic poles of the rotor and the field magnets of the stator. This magnetic attractive force can be utilized as the rotational force for rotating the rotor in the normal direction because the magnetic attractive force acting between the magnetic poles of the rotor and the field magnets of the stator positioned ahead in the rotational direction of the rotor, when looked from the magnetic poles of the rotor, is greater than the magnetic attractive force acting between the magnetic poles of the rotor and the field magnets of the stator positioned behind in the rotational direction of the rotation of the rotor.

Further, a fifth aspect of this invention is to provide a rotary electric machine comprising a rotary electric machine of an inner rotor type, with a cylindrical rotor arranged concentrically inside a hollow stator at a distance of a gap; wherein said rotor is arranged with a plurality of field magnets disposed in a spaced relationship along a circumferential direction on its surface directed to said stator in such a manner that all magnetic poles of said field magnets on the side directed to said stator have the same polarity; said stator is mounted with a plurality of magnetic pole generating means comprised each of a stator winding wound on its core, disposed along a circumferential direction on its surface directed to said rotor, in a spaced relationship in accordance with the position in which said field magnet is disposed; a control mechanism comprises a position detector for detecting the position of rotation of said rotor and a drive circuit for exciting said stator winding in accordance with the position detected by said position detector; and said control mechanism is structured such that said stator winding is excited in the direction in which the magnetic pole of said stator on the side directed to said field magnet generates the same polarity as that of the magnetic pole of said field magnet facing said stator and that said stator winding is excited at a timing when a combination of a magnetic repulsive force to be received by said field magnets of said rotor from the magnetic poles on said stator side behind in the rotational direction of said rotor with a magnetic repulsive force to be received thereby from the magnetic poles on said stator side ahead in the rotational direction thereof turns into a force for urging the rotation of said rotor in its normal direction, when said rotor winding is excited, because the magnetic repulsive force received from the magnetic poles on the stator side disposed on the rear side in the rotational direction of said rotor is greater than the magnetic repulsive force received from the magnetic poles disposed on the front side in the rotational direction thereof, and, on the other hand, that the excitation of said stator winding is suspended at a timing when the rotation of said rotor in the normal direction is decreased because the relationship of the magnetic repulsive forces between the magnetic poles on the stator sides is reversed.

Additionally, a sixth aspect of this invention is to provide a rotary electric machine of an outer rotor type, in which, said rotor is of a hollow structure and said stator is disposed concentrically inside said hollow rotor at a distance of the gap, in place of the arrangement of said rotor inside said stator.

In a seventh aspect, this invention is to provide a rotary electric machine in which, in the rotary electric machine in the fifth aspect as described hereinabove, said stator is disposed concentrically inside said hollow rotor at a distance of this gap; the magnetic poles on the side opposite to the magnetic poles of the field magnets of said rotor are arranged so as to appear in the circumferential direction on the inner surface of said rotor; said inner stator is arranged with a plurality of said magnetic pole generating means, each with its stator winding wound on its core, in the circumferential direction on the surface directed to said rotor in a spaced relationship in accordance with the position in which the field magnets of said rotor are disposed; and said electricity-applying control mechanism is structured such that a winding of said inner stator is excited in substantially the same manner as the winding of said outer stator, too, with the exception that the polarity of the magnetic pole of said inner stator on the side directed to said rotor becomes the same as the polarity of the magnetic poles inside the field magnets of said rotor.

In the rotary electric machines in the fifth, sixth and seventh aspects of this invention, the excitation of the stator winding can produce the magnetic repulsive force acting between the field magnets of the rotor and the magnetic poles of the stator and this magnetic repulsive force can be utilized as the rotational force for rotating the rotor in the normal direction. On the other hand, even when the excitation of the stator winding is suspended, a small magnitude of the magnetic attractive force acts between the core of the stator and the field magnets of the rotor and the rotor can be kept on rotating in the normal direction by the magnetic attractive force and the rotational inertia of the rotor.

In accordance with the present invention, an eighth aspect is to provide a rotary electric machine in which, in each of the rotary electric machines in the fifth, sixth and seventh aspects, said stator winding is excited in the reverse direction at the timing, thereby causing the magnetic attractive force to act between the field magnets of said rotor and the magnetic poles of said stator and converting said magnetic attractive force into the rotational force for rotating said rotor in its normal direction, in place of the arrangement such that the excitation of said stator winding is suspended at the timing when the rotation of said rotor in its normal direction is decreased because the relationship of said magnetic repulsive forces between the magnetic poles of said field magnets of said rotor and the magnetic poles of said stator is reversed, when said stator winding is excited.

In the rotary electric machine in the eighth aspect of this invention, when the stator winding is excited in the reverse direction, the field magnets of the rotor are made opposite in polarity to the magnetic poles of the stator, thereby producing a strong magnitude of the magnetic attractive force between the field magnets of the rotor and the magnetic poles of the stator. This magnetic attractive force can be utilized as the rotational force for rotating the rotor in the normal direction because the magnetic attractive force acting between the field magnets of the rotor and the magnetic poles of the stator located ahead in the rotational direction is greater than that acting between the field magnets of the rotor and the magnetic poles of the stator positioned behind in the rotational direction.

BEST MODES FOR CARRYING OUT THE INVENTION

The present invention will be described in more detail by way of examples with reference to the accompanying drawings.

Figure 1:
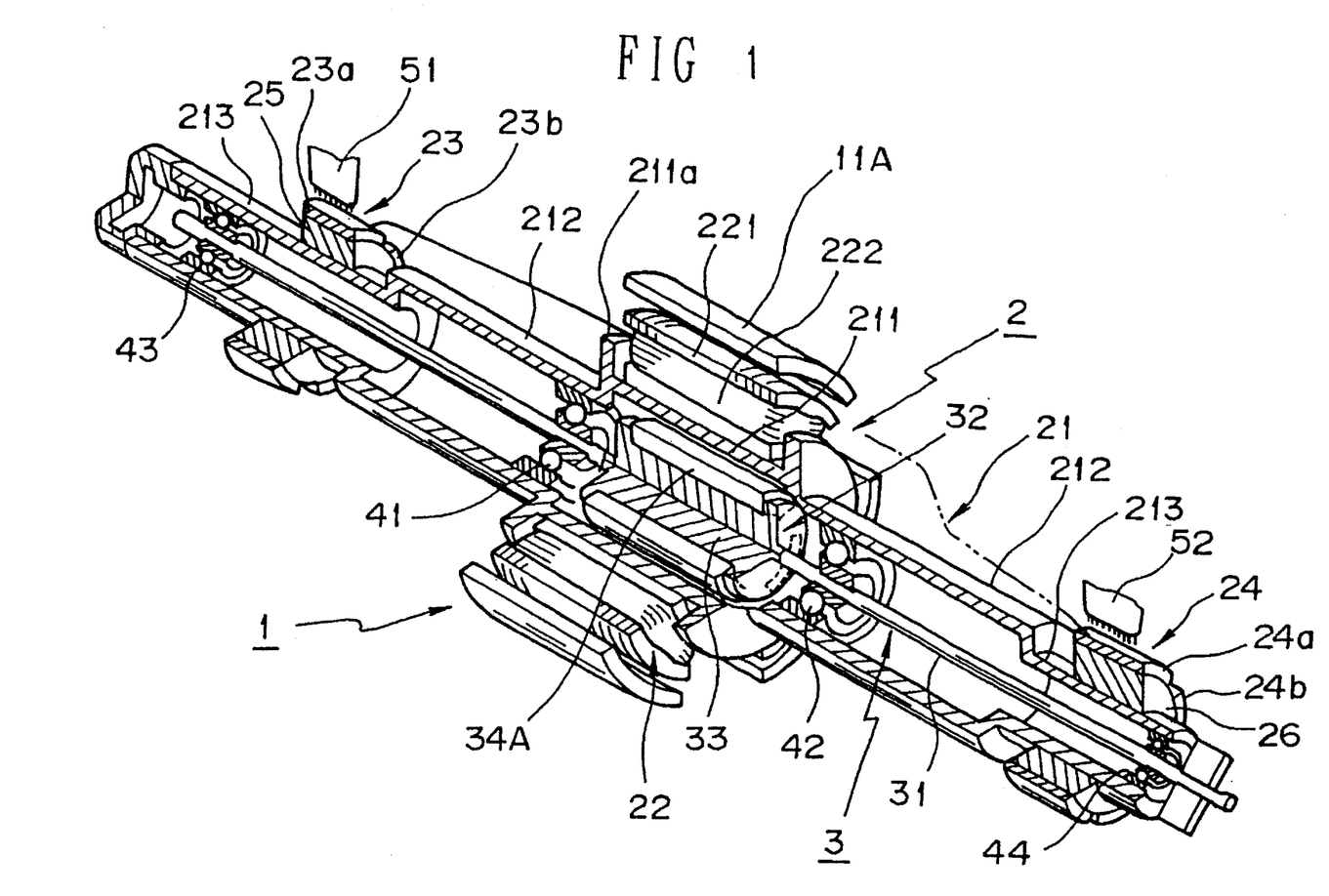
FIG. 1 is a partially sectional perspective view showing an outline of the rotary electric machine according to an embodiment of the present invention.
Figure 2:
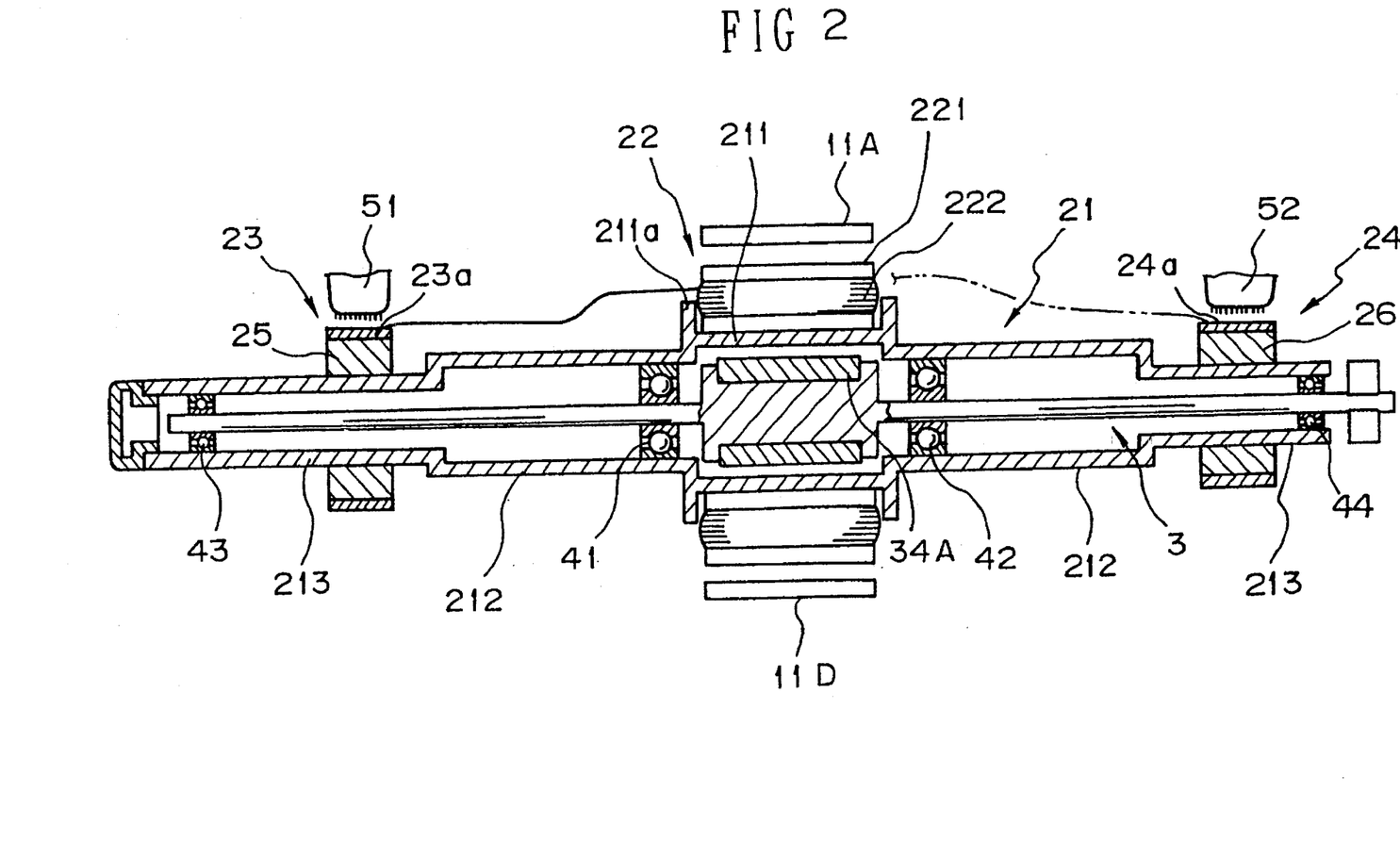
FIG. 2 is a longitudinal view in section showing the rotary electric machine according to the embodiment of this invention.
Figure 3:
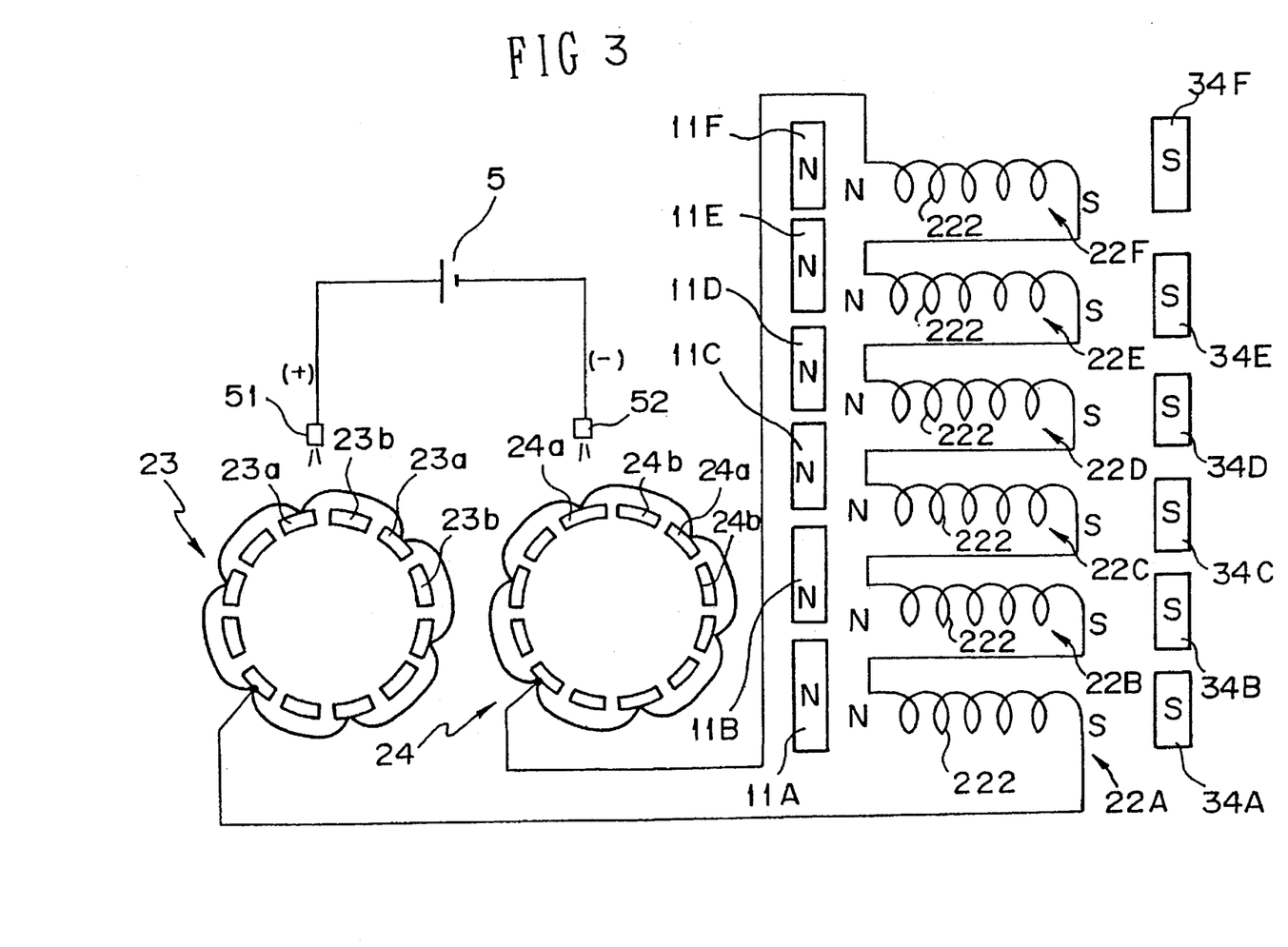
FIG. 3 is a diagram showing the electrical wiring of the rotary electric machine according to the embodiment of this invention.
Figure 5:
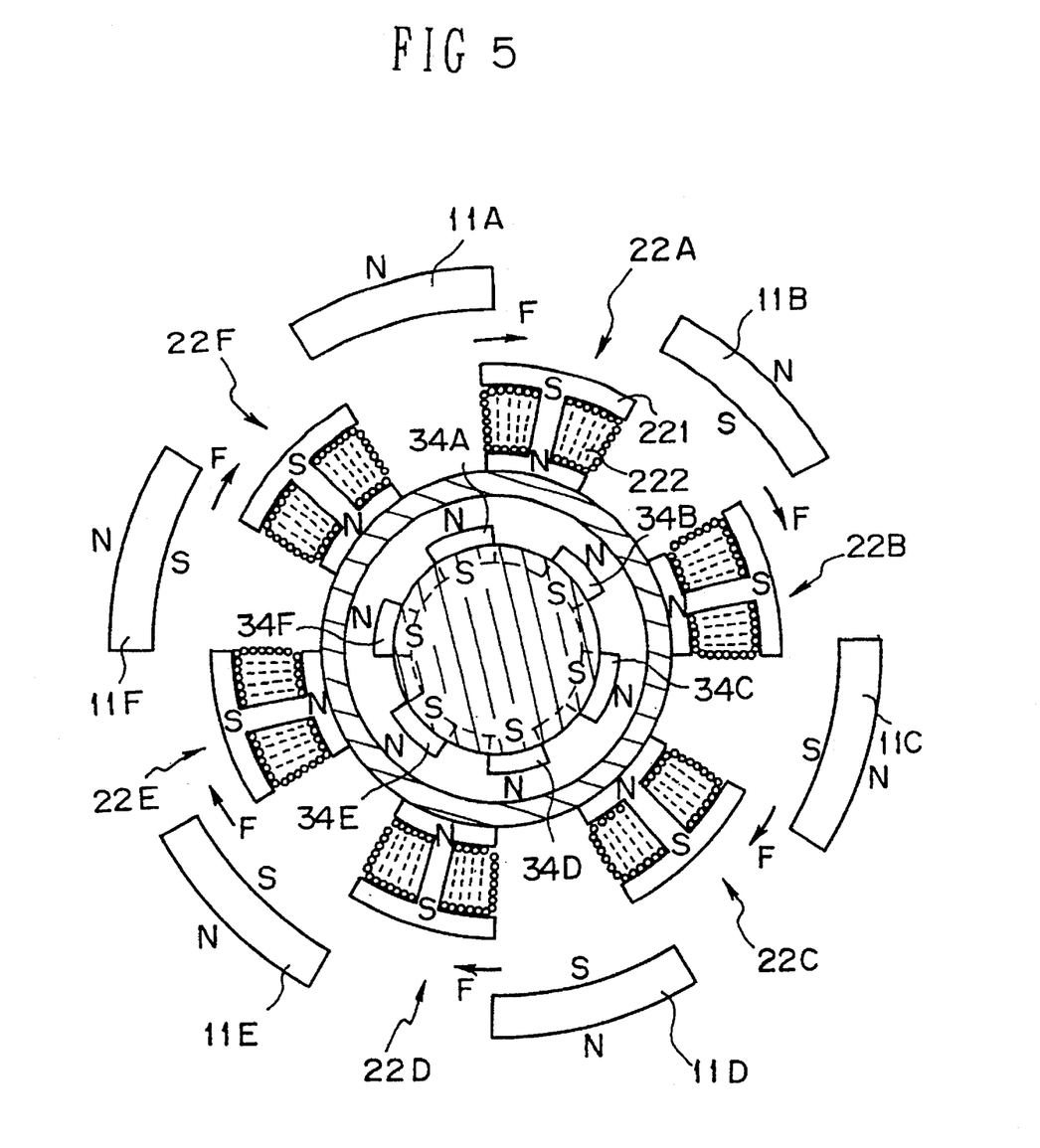
FIG. 5 is a schematic representation for describing the operations of the rotary electric machine according to the embodiment of this invention.
Figure 6:
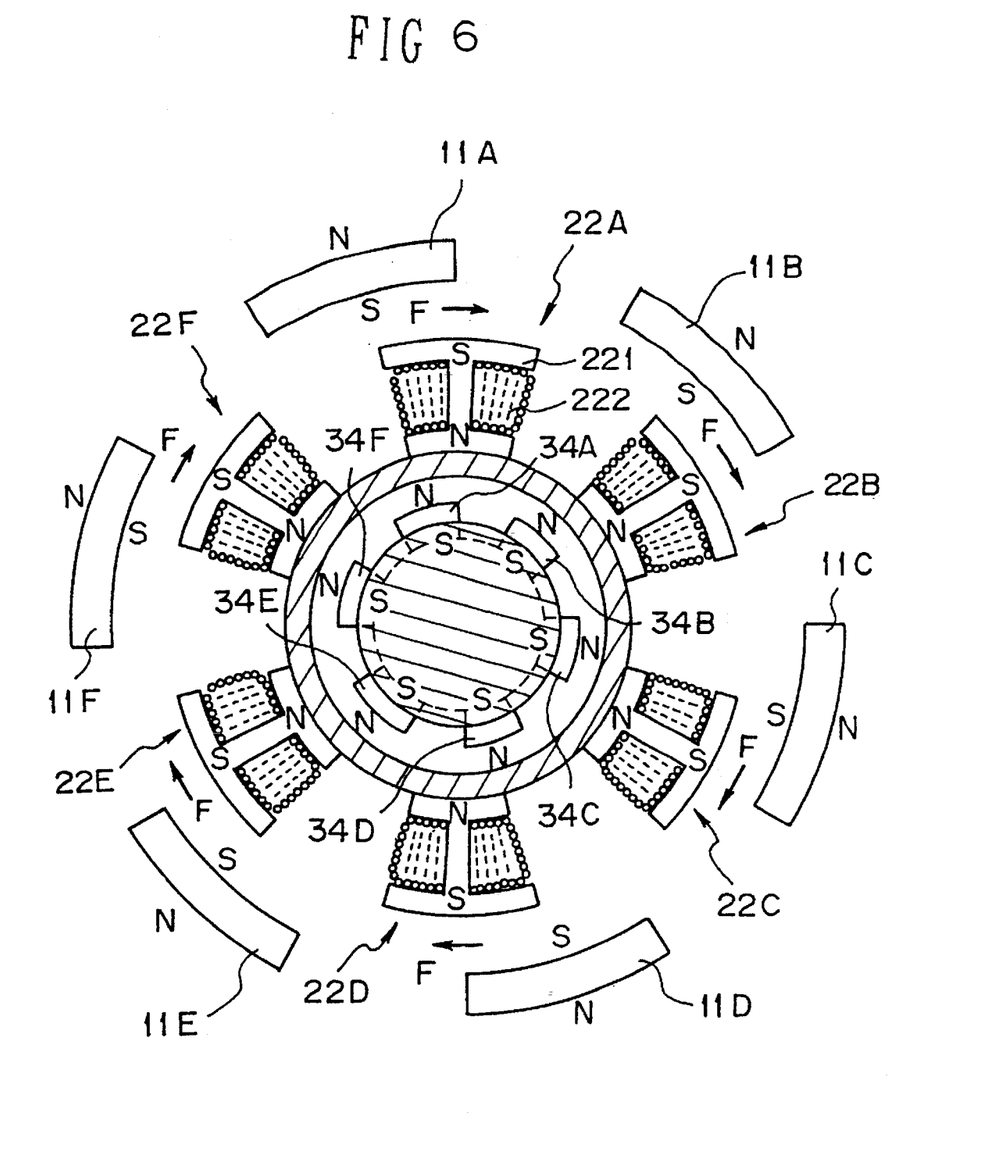
FIG. 6 is a schematic representation for describing the operations of the rotary electric machine according to the embodiment of this invention.

FIG. 1 shows an example in which the rotary electric machine according to the present invention is utilized as a motor and is a partially sectional perspective view showing an outline of the motor. FIG. 2 is a longitudinal view in section showing the motor; FIG. 3 is a diagram showing the electrical wiring of the motor; and FIGS. 4 to 6 are views for describing the operations of the motor and transverse view in section showing the essential portion of the armature and the field system.

The armature in this embodiment of the invention generally comprises a rotor 2 of a hollow cylindrical body, an outer stator 1 disposed concentrically on an outer circumference of the rotor 2 with a gap interposed therebetween and an inner stator 3 disposed in a hollow portion concentrically on an inner circumference of the rotor 2 with the gap interposed therebetween.

The rotor 2 compresses a hollow cylindrical body 21, an armature 22 secured to the hollow cylindrical body 21 and commutators 23 and 24. The hollow cylindrical body 21 comprises a sectionally long size section 211 located at its middle position, medium size sections 212 disposed at the both sides of the long size section 211, and short size sections 213 disposed at the outer sides of the respective medium size sections 212 and it consists of a hollow cylindrical body with its inside made of brass. The long size section 211 has a flange portion 211a at each of its both ends, and the armature 22 is fixed to an outer circumferential surface of the large size section 211 interposed between the flange portions 211a.

Figure 4:
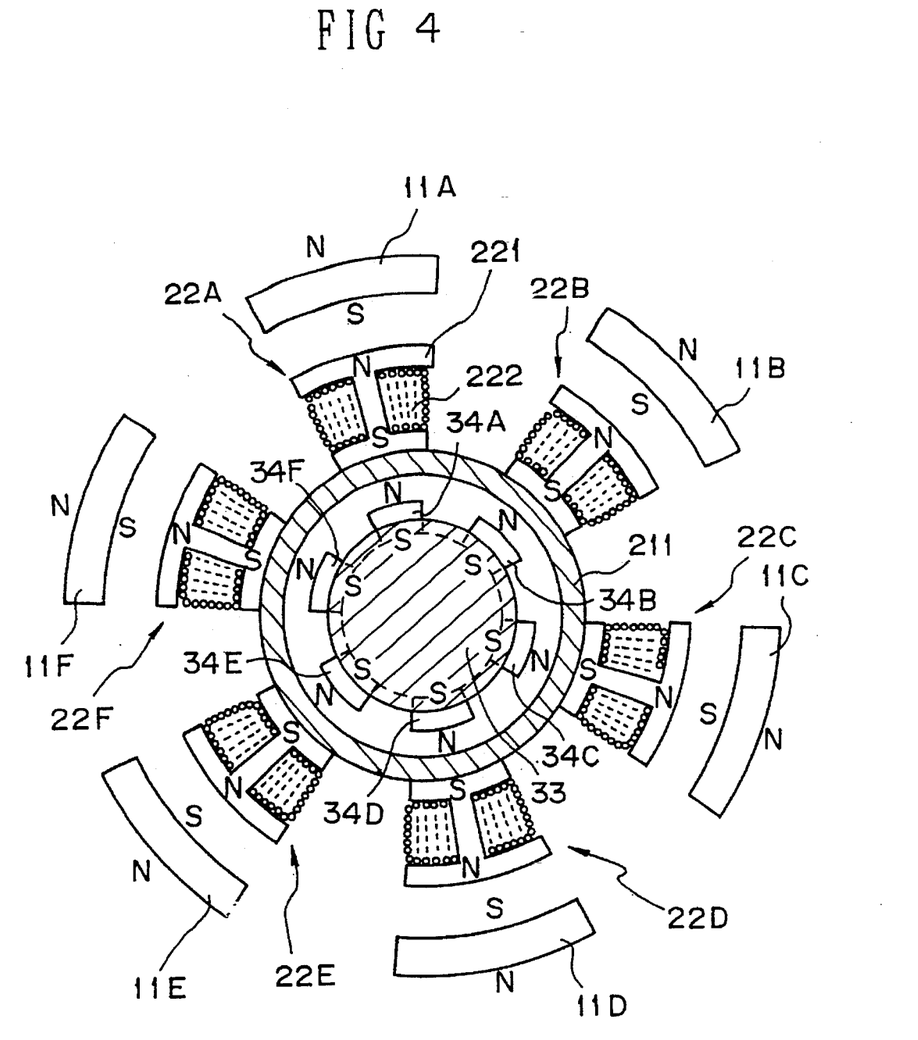
FIG. 4 is a view showing an example of the arrangement of rachet bearings.

The armature 22 comprises six armature sections 22A to 22F disposed in a spaced relationship equally apart (each at the angle of 60°) along the outer circumference of the long size section 211, as shown in FIG. 4, when looked at the transverse section of the long size section 211. Each of the six armature sections 22A to 22F comprises an armature core 221 formed with silicon-steel plates of a sectionally H-shaped form arranged in layers and an armature winding 222 wound in a groove section of each of the armature core 221. A base end portion of the armature 22 is secured to the long size section 211 such that its longitudinal direction coincides with the axial direction of rotation and its head portion constitutes a salient pole projecting into the gap formed between the outer stator 1 and the rotor 2.

To the short size section 213 disposed at the both sides of the hollow cylindrical body 21 are fixed the commutators 23 and 24, respectively, and each of the commutators 23 and 24 comprises twelve commutator pieces which are arranged on insulators 25 and 26, respectively, fixed to the small size section along and in the circumferential direction of the short size section 213 so as to be insulated electrically between each other. The commutators 23 and 24 are connected by the connection between the commutator pieces and the lead wire from the armature winding 222, in a manner as will be described hereinafter.

The hollow cylindrical body 21 is secured to the main body of the motor in such a manner that a gap is formed between the rotor 2 and the stator 3 at the hollow portion on the inner circumference side of the hollow cylindrical body 21 of the rotor 2. The inner stator 3 comprises a stator shaft 31 and an inner field system section 32 disposed at a middle portion of the stator shaft 31. The rotor 2 is rotatably supported by the inner stator 3 through bearings 41 to 44.

To the inner field system section 32 of the inner stator 3 are mounted six field magnets 34A to 34F along the outer circumference of the large size section 33 arranged at a middle portion of the stator shaft 31 (i.e. the hollow portion inside of the long size section 211 of the rotor 2). Each Of the field magnets 34A to 34F is comprised of a permanent magnet of a longitudinally extended, sectionally arc-shaped form, and they are arranged in an equally angularly spaced relationship each at the angle of 60° in the circumferential direction along the outer circumference off, the large size section 33, when looked at the transverse section of the large size section 33. The field magnets 34A to 34F are arranged in such a fashion that their polarities directed to the rotor 2 are all provided with North magnetic poles and their polarities directed to the large size section 33 (i.e. the polarities on the side secured to the large size section) are all provided with South magnetic poles.

The outer stator 1 is structured in such a manner that six field magnets 11A to 11F are mounted as outer field magnet sections to an inner circumferential surface of a motor housing facing the long size section 211 of the rotor 2. Each of the field magnets 11A to 11F is comprised of a permanent magnet of a longitudinally extended, sectionally arc-shaped form and they are disposed in a spaced relationship equally apart from each other at the angle of 60° in the circumferential direction along the inner circumference of the motor housing, when looked at its transverse section, and in the line extending substantially in the radially axial line in which the field magnets 34A to 34F of the inner stator 3 are disposed with the field magnets 11A to 11F aligned axially in the radial direction with the field magnets 34A to 34F, respectively. The field magnets 11A to 11F are arranged in such a fashion that their polarities directed to the rotor 2 are all provided with South magnetic poles and their polarities directed to the motor housing (i.e. the polarities on the side secured to the motor housing) are all provided with North magnetic poles.

Now, a description will be made of the relationship of the armature winding of the rotor 2 with the connection of each of the commutators 23 and 24 with reference to FIG. 3. As twelve commutator pieces are arranged in an equally spaced relationship on each of the commutators 23 and 24 in its circumferential direction, each of the commutator pieces is disposed in an arrangement equally spaced from each other at the angle of 30°, when looked at its transverse section. The position in which each of the commutator pieces of the commutator 23 is disposed is the same as the position in which each of the commutator pieces of the commutator 24 is disposed, when looked at the transverse sections of the commutators 23 and 24.

The armature winding 222 of each of the armature sections 22A to 22F of the rotor 2 is connected with each other in a serial arrangement and the lead wire is extended from one end side of the armature winding 222 of the armature section 22A and connected to the commutator 23, while the lead wire is extended from the other end side of the armature winding 222 of the armature section 22F and connected to the commutator 24. The commutator 23A and the commutator 24a of the commutators 23 and 24 and every other ones are snort-circuited electrically by their lead wires and the short-circuited commutator pieces 23a and 24a as well as the other short-circuited are connected with the lead wires led from the armature sections 22A and 22F, respectively.

This arrangement allows an outside battery 5 to apply electric current to these short-circuited commutator pieces 23a and 24a and the other short-circuited commutator pieces through brushes 51 and 52 and brushes, when the brushes 51 and 52, etc. come into contact with the commutator 23A and the commutator 24a and the short-circuited commutator pieces, respectively. When the electric current is supplied from the outside battery 5 to the commutator pieces 23a and 24a, the direct current is applied to the armature winding 222 of each of the armature sections 22A to 22F. On the other hand, the commutator pieces 23b and 24b as well as the other commutator pieces, which are not short-circuited, are arranged such that the application of electricity to their respective armature windings 222 is suspended.

Now, a description will be made of the relationship of the arrangement of each of the commutator pieces with the arrangement of the armature sections 22A to 22F of the rotor 2, which allows an application of electricity. When each of the armature sections 22A to 22F is rotated to the position (nearly the position as shown in FIG. 5) right before each of the outer field magnets 11A to 11F and the inner field magnets 34A to 34F, respectively, each being located ahead in the direction of rotation of each of the armature sections 22A to 22F, the short-circuited commutator pieces 23a and 24a come into no contact with the brush 51, thereby suspending the application of electricity to the armature winding. Then, when the short-circuited commutator pieces 23a and 24a are brought into contact with the brush 51 again in the position (nearly the position as shown in FIG. 4) after the armature sections 22A to 22F have passed through the outer field magnets 11A to 11F and the inner field magnets 34A to 34F, respectively, electricity is applied again to the armature windings. In other words, the brush 51 is arranged with each of the commutator pieces in such a manner that the brush 51 is in contact with the commutator 23b and the commutator 24b, which are not connected electrically, in the position in which each of the armature sections 22A to 22F is passing through the outer field magnets 11A to 11F and the inner field magnets 34A to 34F, respectively.

It is noted herein that the direction in which electric current is applied to the armature sections 22A to 22F is arranged in such a way that, when electricity is applied to the armature winding 222 of the armature sections 22A to 22F, the polarities on the side of their head portions directed to the sides of the outer field magnets 11A to 11F of the armature core 221 are provided all with South magnetic poles while the polarities on the side of their base end portions directed to the sides of the inner field magnets 34A to 34F thereof are provided all with North magnetic poles.

Then, the operations of the rotary electric machine according to the present invention will be described.

First, a description will be made of the operations of the rotary electric machine when no electric voltage is applied from the outside battery 5 to the motor, with reference to FIG. 4. In this case, as no electric current is applied to the armature sections 22A to 22F of the rotor 2, the armature sections 22A to 22F do not produce a magnetic flux by themselves, whereby each of them works merely as a yoke. As a result, the armature core 221 of each of the armature sections 22A to 22F is arranged such that its head portion side is induced by the South magnetic pole of each of the outer field magnets 11A to 11F, thereby producing North magnetic pole, while its base end portion side is induced by the North magnetic pole of each of the inner field magnets 34A to 34F, thereby producing South magnetic pole. Then, the armature 22 becomes in a stationary state because the magnetic attractive force are balanced between the North magnetic poles at the head portion side of the armature core 221 and the South magnetic pokes at the base end portion side thereof, in the position as shown in FIG. 4.

Then, a description will be made of the state in which the electric voltage is kept applied to the motor from the outside battery 5, with reference to FIG. 5. In this case, each of the armature sections 22A to 22F acts as an electric magnet and the head portion side of the armature core 221 of each of the armature sections 22A to 22F acts all as South magnetic pole and the base end portion side thereof acts all as North magnetic pole, as described hereinabove. Hence, the armature sections 22A to 22F are structured such that their head portion sides of the armature core 221 (the South magnetic poles) receive the magnetic repulsive force from the outer field magnets 11A to 11F (the South magnetic poles) of the outer stator 1 and, likewise, their base end portion sides of the armature core 221 (the North magnetic poles) receive the magnetic repulsive force from the inner field magnets 34A to 34F (the North magnetic poles), whereby the armature 22 are caused to be stayed in a stationary state in the intermediate position in which the magnetic repulsive forces are balanced between each of the armature sections 22A to 22F and the adjacent field magnets (11A to 11F or 34A to 34F).

A description will now be made of the operations of the rotation of the rotary electric machine according to the present invention, having the actions of the magnetic force, as described hereinabove. When a battery electric voltage is applied to the motor in such a state as shown in FIG. 4, the armature sections 22A to 22F are excited, and the repulsive force acts between the magnetic poles (South magnetic poles) generated toward the outer gap and the outer field magnets 11A to 11F and between the magnetic poles (North magnetic poles) generated toward the inner gap and the inner field magnets 34A to 34F. At this time, as there is a deviation, although very small, from the center of each of the outer field magnets 11A to 11F and the inner field magnets 34A to 34F and the center of the armature sections 22A to 22F, the repulsive force causes the rotor 2 to start rotating in the clockwise direction or in the counterclockwise direction. In this case, the repulsive force works as a rotation urging force F for urging the rotation for rotating the rotor 2 in the clockwise direction.

When the rotor 2 rotates in the clockwise direction, for example, to the position as shown in FIG. 6, the commutator 23A and the commutator 24a of the respective commutators 23 and 24 are still in contact with the brush 51 and electricity is applied to each of the armature sections 22A to 22F, thereby producing a repulsive magnetic field. At this time, each of the armature sections 22A to 22F rotates the rotor 2 in the clockwise direction with a stronger rotation-urging force F because the repulsive force to be received from the field magnets located behind in the rotational direction is greater than the repulsive force to be received from the field magnets located ahead in the rotational direction (for instance, for the armature section 22A, the repulsive force from the field magnets 11F and 34F, located behind in the rotational direction, is Greater than that from the field magnets 11B and 34B located ahead in the rotational direction, respectively).

Further, when the rotor 2 rotates to the position as shown in FIG. 5 (that is, the position in which a tip of the core of each of the armature sections 22A to 22F comes to the position right before the field magnet located ahead in the rotational direction), each of the armature sections 22A to 22F decelerates the rotation of the rotor 2 because the repulsive force received from the field magnet located ahead in the rotational direction becomes equal to the repulsive force received from the field magnet located behind in this position and the repulsive force received from the field magnet located ahead becomes greater than the repulsive force received from the field magnet located behind, when the rotor 2 further rotates over this position.

From this position, however, the commutator 23A and the commutator 24a of the respective commutators 23 and 24 come into non-contact with the brush 51, that is, the brush 51 is about to come into contact with the commutator pieces 23b and 24b which in turn are in non-contact with the brush 51, thereby suspending the application of electricity to each of the armature sections 22A to 22F and then causing each of the armature sections 22A to 22F to extinguish the generated repulsive magnetic field. Then, as the armature core of each of the armature sections 22A to 22F acts merely as a yoke as described hereinabove, thereby producing the magnetic poles of the opposite polarity that attract the facing field magnets. Hence, the rotor 2 is not pushed back due to the repulsive force from the field magnets located ahead in the rotational direction. As a result, the rotor 2 keeps being rotated by the magnetic attractive force from the field magnets located in the rotational direction and the rotational inertia of the rotor 2, thereby reaching the position as shown in FIG. 4.

In this position (that is, the position after the tip of the core of each of the armature sections 22A to 22F has passed through the field magnets), the armature sections 22A to 22F further keep rotating by the rotational inertia and, at the same time, they are excited again receiving a strong magnetic repulsive force in the normal direction. As a result, the rotor 2 receives the stronger force for urging its rotation, further rotating to the like position as shown in FIG. 5. The rotor 2 rotates at an increasing speed by repeating the operations as described hereinabove.

For the rotary electric machine according to the present invention, the rotor 2 is rotated by utilizing the magnetic repulsive force as the force for urging the rotation when electricity is applied to the armature sections 22A to 22F, while it is rotated by utilizing the magnetic attractive force, although considerably smaller than the magnetic repulsive force, as the force for urging the rotation, when no electricity is applied to the armature sections 22A to 22F. Further, as each of the armature sections 22A to 22F receives the force for urging the rotation from both of the outer field magnets 11A to 11F of the outer stator 1 and the inner field magnets 34A to 34F of the inner stator 3, a larvae magnitude of torque is generated and these rotation-urging forces can be utilized efficiently, thereby leading to the rotation of the rotor 1 at a high speed.

Figure 7:
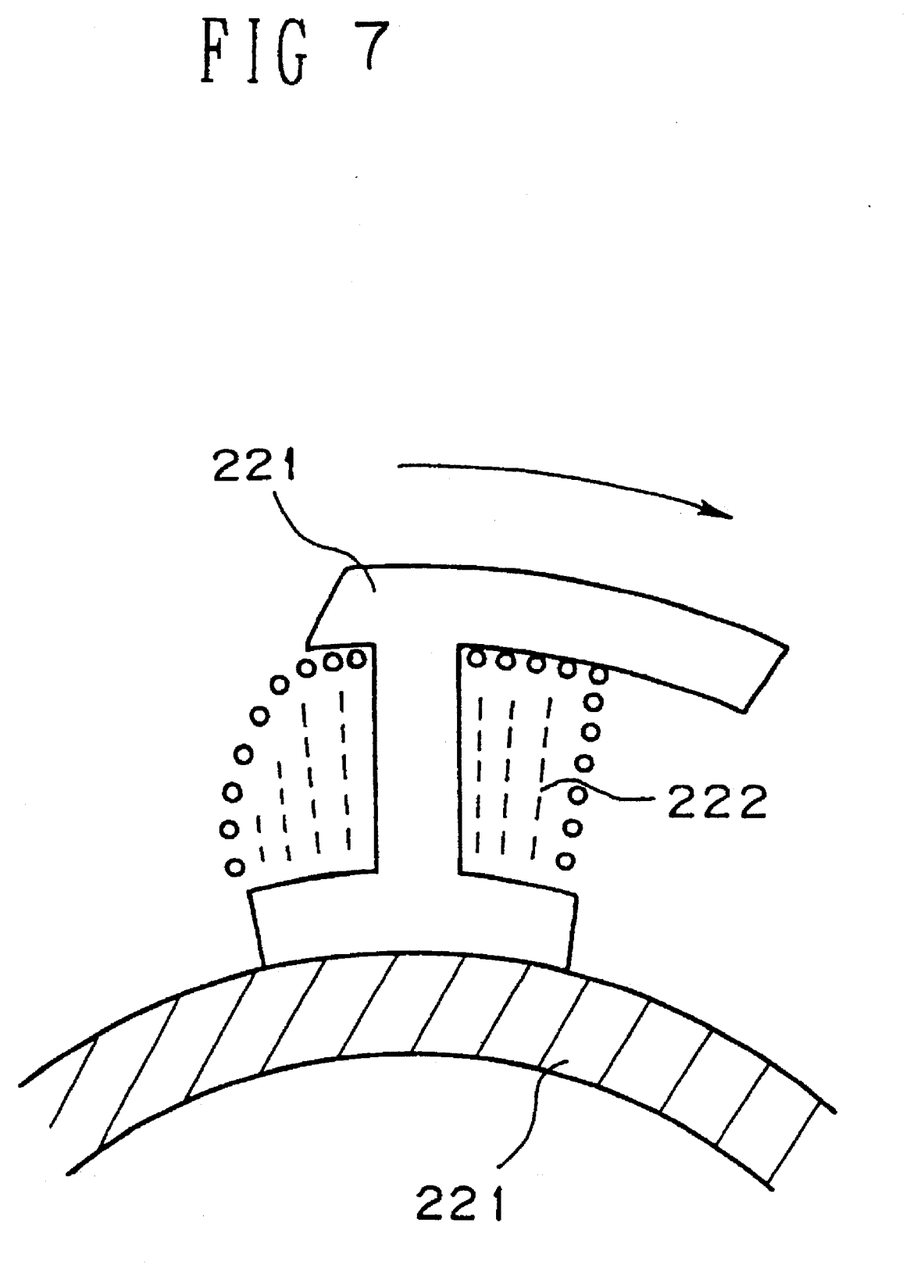
FIG. 7 is a schematic representation showing the arrangement of the armature according to the embodiment of this invention.

In the rotary electric machine according to the embodiment as described hereinabove, the armature core 221 of each of the armature sections 22A to 22F is of an H-shaped form; however, as shown in FIG. 7, it may be structured in such a manner that a flange section of its head portion may be arranged for its front section in its rotational direction to become longer than its rear section in its rotational direction (in a so-called "one-wing" shape). This arrangement of the armature core 221 can rotate the rotor 2 more smoothly.

Figure 11:
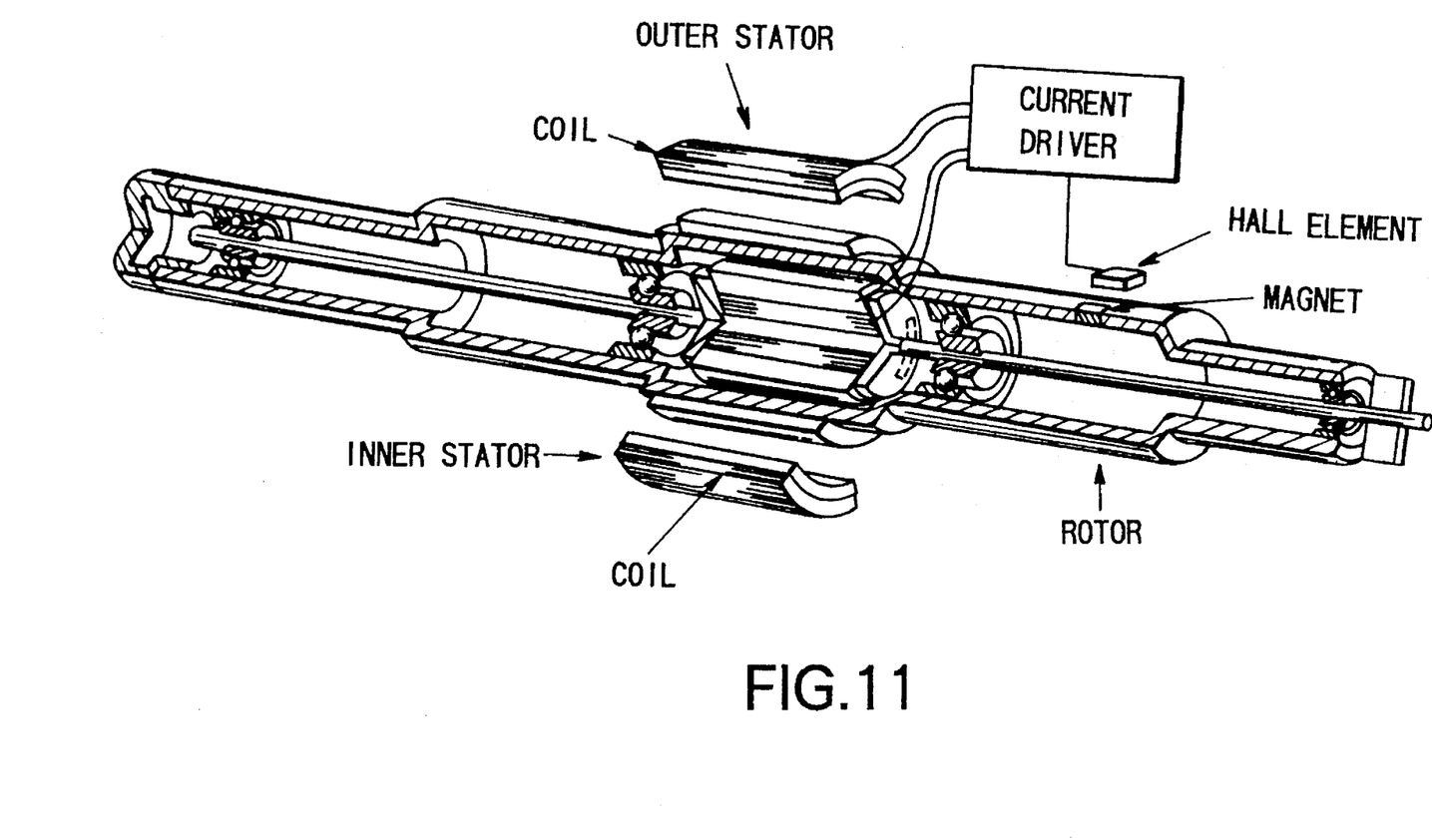
FIG. 11 is a partially sectional perspective view of a rotary electric machine.

In practicing the embodiments of the present invention, various modifications and variations are possible. In the above embodiments of this invention, for example, the armature having the winding is mounted to the rotor side and the field system comprising the permanent magnets is mounted to each of the inner and outer stator sides. This arrangement can be reversed. The reverse arrangement can allow the rotary electric machine according to the present invention to be realized as a brushless direct current motor 97 (see FIG. 11), when the rotary electric machine according to the above-described embodiment of this invention is regarded as a direct current motor with a brush.

More specifically, in this case, the rotor side is mounted with the field system comprised of the permanent magnets, in place of the armature and, for example, the North magnetic poles of the permanent magnets are arranged so as to be directed to the inner stator, while the South magnetic poles thereof are arranged so as to be directed to the outer stator. On the other hand, the inner stator is mounted with the armature generating the North magnetic poles directed toward the rotor side disposed outside during the application of electricity, while the outer stator is mounted with the armature generating the South magnetic poles directed toward the rotor side disposed inside during the application of electricity. It is also possible to arrange a rotational angle detecting means, such as a Hall element 99 (see FIG. 11) or the like, to detect the rotational position of the rotor, thereby controlling the application or the disconnection of electricity to or from the armature windings of the inner and outer stators by a semiconductor switch circuit in accordance with the rotational position of the rotor. As the way of turning the application of electricity on or off, it is possible to suspend the application of electricity in the position before the permanent magnets of the rotor pass through the positions of the armatures of the inner and outer stators, located ahead in the rotational direction, and to apply electricity again after the permanent magnets of the rotor have passed therethrough. This arrangement can cause the rotor to rotate only by the magnetic repulsive force in the direction of urging the rotation of the rotor yet without the receipt of the magnetic repulsive force in the direction of decreasing the rotation thereof.

Further, in the rotary electric machine according to the embodiments of this invention, the stator is in a double structure in which the stator comprises the inner stator disposed inside the rotor and the outer stator disposed outside the rotor and it is so arranged as to make twice the force for urging the rotation to be received by the rotor, thereby performing the very efficient rotation of the rotor. It should be noted, however, that this invention is not restricted to this arrangement.

For example, as indicated by the transverse section in FIG. 8, the rotary electric machine may be structured by the rotor and the outer stator disposed outside the rotor, without the arrangement of the inner stator as disposed in the embodiments as described hereinabove. In this case, the rotor is not necessarily of a hollow cylindrical body and it may be of a columnar shape without such a hollow portion. This arrangement provides the rotary electric machine of a so-called inner rotor type.

Conversely, for example, as indicated by the transverse section in FIG. 9, the rotary electric machine may be structured by the rotor and the inner stator disposed inside the rotor, without the arrangement of the outer stator as disposed in the embodiments as described hereinabove. This arrangement provides the rotary electric machine of a so-called outer rotor type.

Figure 8:
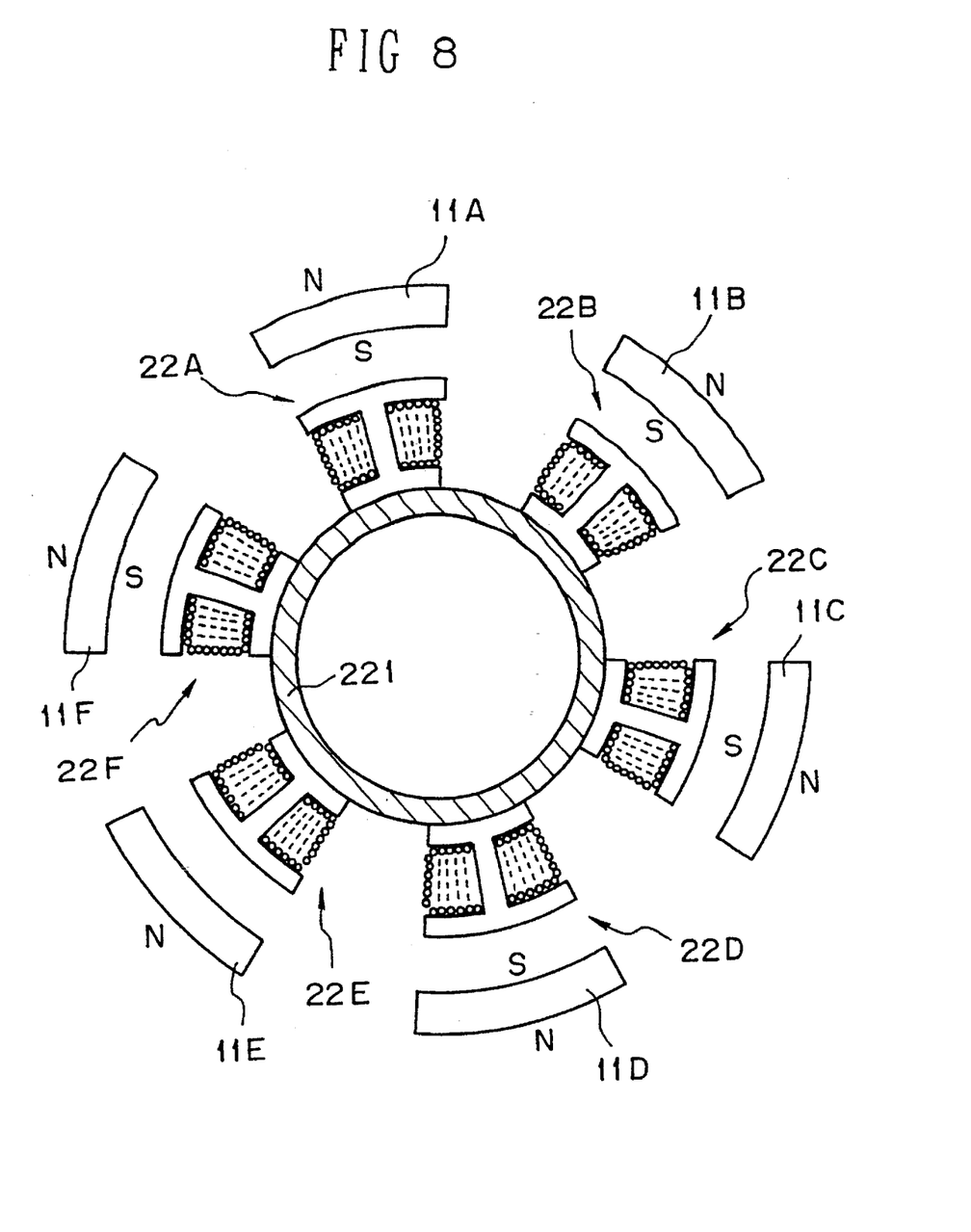
FIG. 8 is a schematic representation showing the arrangement of the rotary electric machine according to the embodiment of this invention.
Figure 9:
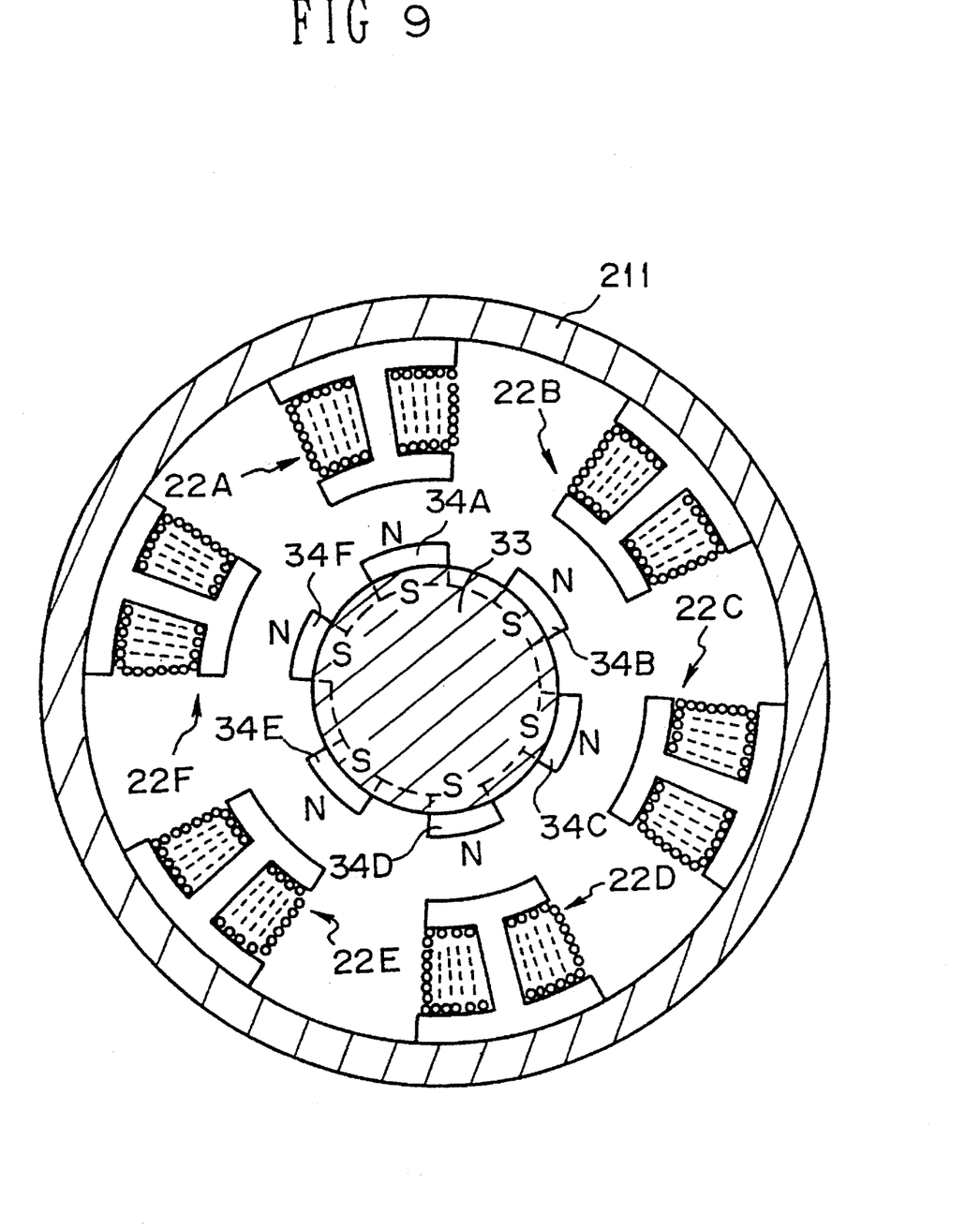
FIG. 9 is a schematic representation showing the arrangement of the rotary electric machine according to another embodiment of this invention.

In addition, the rotary electric machines of the modes as shown in FIGS. 8 and 9 are each a so-called brush direct current motor. However, it is also possible to realize this in the form of a brushless direct current motor.

More specifically, the rotary electric machine in the form as shown in FIG. 8 may be structured such that the permanent magnets are mounted to the inner stator, in place of the armatures mounted to the inner stator, in such a manner that all the permanent magnets have their South magnetic poles directed to the outer stator side and, on the other hand, the armature is mounted to the inner stator, in place of the permanent magnets mounted to the inner stator, in such a manner that the armature generates the South magnetic pole toward the inner stator during the application of electricity. In this embodiment, the rotational position of the rotor is detected by the rotational angle detecting means such as the Hall element 99 (see FIG. 11) and the application of electricity to the armature winding of the outer stator is controlled by a semiconductor switch circuit in accordance with the rotational angle of the rotor. The way of turning electricity on or off may comprise suspending the application of electricity before the position in which the permanent magnets of the rotor pass through the armature of the outer stator disposed ahead in the rotational direction and applying electricity again after they have passed through the position of the armature thereof.

Likewise, the rotary electric machine in the form as shown in FIG. 9 may be structured such that the permanent magnets are mounted to the outer stator, in place of the armatures mounted to the outer stator, in such a manner that all the permanent magnets have their North magnetic poles directed to the inner stator side and, on the other hand, the armature is mounted to the inner stator, in place of the permanent magnets mounted to the inner stator, in such a manner that the armature generates the North magnetic pole toward the inner stator during the application of electricity. In this embodiment, the rotational position of the rotor is detected by the rotational angle detecting means such as the Hall element and the application of electricity to the armature winding of the inner stator is controlled by the semiconductor switch circuit in accordance with the rotational angle of the rotor. The way of turning electricity on or off may comprise suspending the application of electricity before the position in which the permanent magnets of the rotor pass through the armature of the outer stator disposed ahead in the rotational direction and applying electricity again after they have passed through the position of the armature thereof, in the manner as described hereinabove.

In the rotary electric machines according to the embodiments of this invention as described hereinabove, the excitation of the field magnets (or the armatures) is suspended in the position before the armatures of the rotor (or the field magnets) pass through the field magnets (or the armatures) disposed ahead in the rotational direction of the rotor and the field magnets (or the armatures) are excited again in the position after they have passed therethrough. This arrangement allows the armature to work merely as a yoke in the range extending from the position in which they are about to pass to the position in which they have passed, thereby producing the magnetic attractive force and the rotational inertia, although smaller than the magnetic repulsive force, and to cause the rotor to keep rotating by the magnetic attractive force and the rotational inertia. It is to be understood, however, that this invention is not restricted to this arrangement. It is also possible to forcibly produce a stronger magnetic attractive force by applying the electric current to the armature winding in the opposite direction in the range extending the position in which they are going to pass to the position in which they have passed. In such a case, the armature is provided with the magnetic poles of the polarities opposite to the facing field magnets, thereby producing the strong magnitude of the magnetic attractive force between the field magnets and enabling the magnetic attractive force as the force for urging the rotation to rotate the rotor more strongly.

Figure 10:
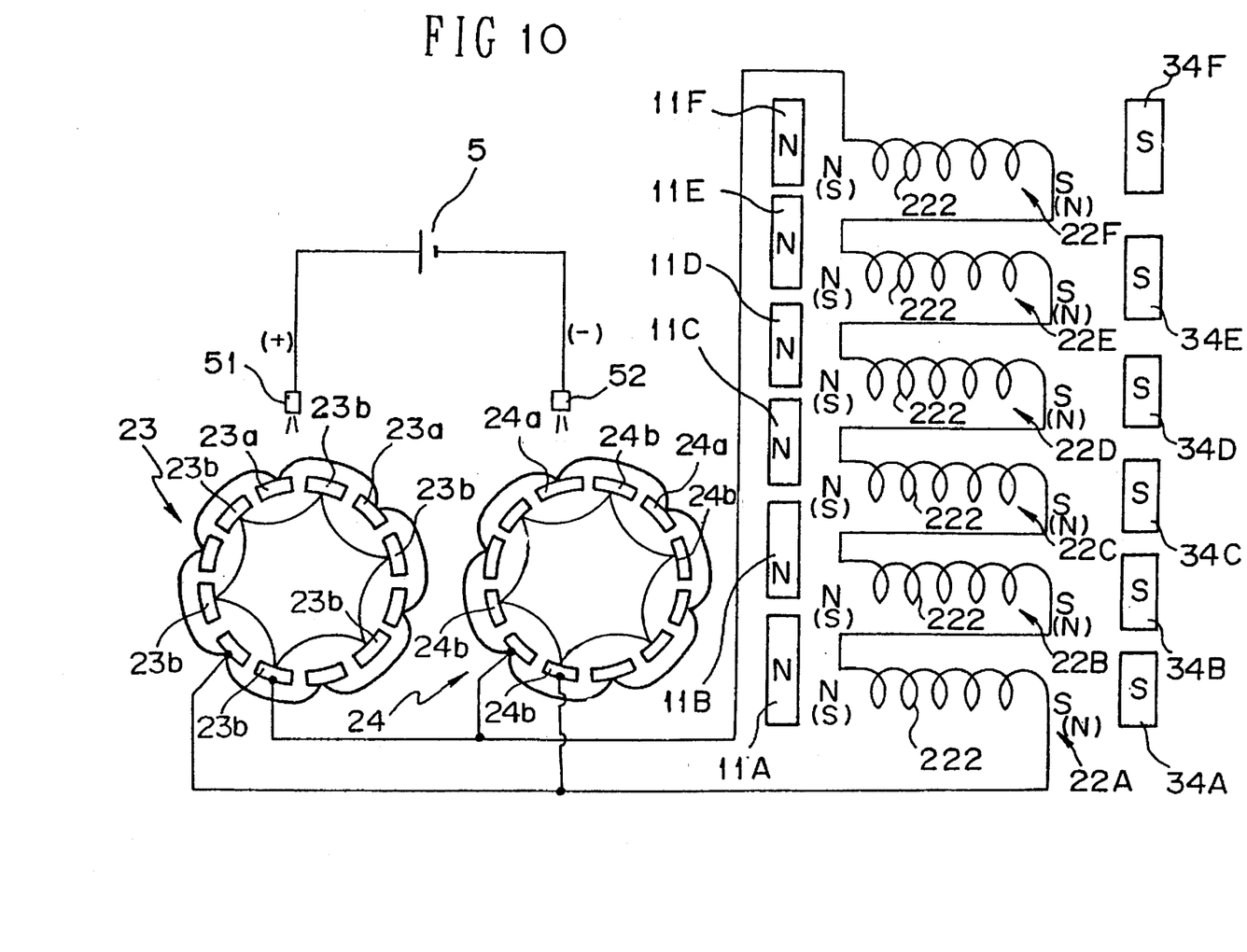
FIG. 10 is a schematic representation showing the electrical wiring of the rotary electric machine according to a further embodiment of this invention.

FIG. 10 shows the electrical wiring of the rotary electric machine according to the embodiment of this invention, as described hereinabove. The basic arrangement of the rotary electric machine of this invention is substantially the same as the rotary electric machine as shown in FIG. 1, although the electrical wiring is different therefrom. As shown in the drawing, all the commutator pieces 23b of the commutator 23 are short-circuited and all the commutator pieces 24b of the commutator 24b are likewise short-circuited. To a group of the commutator pieces 23b are connected the lead wire led from the armature winding 222 of the armature 22F. Likewise, to a group of The commutator pieces 24b are connected the lead wire led from the armature winding 222 of the armature 22a.

This arrangement allows the electric current to flow to the armature winding 222 of each of the armature sections 22A to 22F in the direction opposite to the direction in which the electric current has previously been flown, when each of the armature sections 22A to 22F exceeds the respective positions defined as the positions before they are about to pass through the field magnets, thereby causing the magnetic poles of the opposite polarities to appear on the facing field magnets 11A to 11F and the field magnets 34A to 34F, respectively, enabling the magnetic attractive force between them and urging the rotation of the rotor 2 in the normal direction by the magnetic repulsive force. This arrangement can allow the resulting rotary electric machine to generate a very large magnitude of an output torque.

In the embodiments of this invention, it is to be noted herein that the number of the magnetic poles mounted to the rotor and the stator is six in each case; however, as a matter of course, the present invention is not restricted to this arrangement and it may be comprised of any mode in which the number of the magnetic poles may be two magnetic poles or more. Further, it is not necessarily required to make the number of the magnetic poles for the rotor equal to the number of the magnetic poles for the stator and it is also possible, for example, to provide the stator with six magnetic poles and, on the other hand, the rotor with three magnetic poles. The rotary electric machine of this arrangement can be operated although the rotational force may be decreased to some extent.

Further, in the embodiment as shown in FIG. 1, the field magnets of the inner stator are aligned in the radially axial direction with those of the outer stator, when looked at the transverse section. It can be noted herein, however, that this invention is not necessarily restricted to this arrangement. It is also possible to deviate the positions of the field magnets of the inner stator and the outer stator by the arrangement in which the positions of the magnetic poles appearing on the outer side surface of the rotor and on the inner side surface thereof can be adjusted appropriately by aligning them with the positions of the field magnets of the inner stator and the field magnets of the outer stator, respectively.

In addition, in the embodiments as described hereinabove, the field system is comprised of the permanent magnets. It can be noted herein, however, that this invention is not restricted to the such field system and that it may be comprised of electrical magnets.

The embodiments of this invention can be applied to the arrangements of the rotary electric machines as will be described hereinbelow. For example, in the rotary electric machines of the embodiment as shown in FIG. 1, the angle at which each of the inner field magnets 34A to 34F of the inner stator is deviated by 30°. More specifically, each of the inner field magnets 34A to 34F of the inner stator is arranged between the adjacent field magnets out of the respective field magnets 11A to 11F of the outer stator. The polarities of all the inner field magnets 34A to 34F of the inner stator 3 directed to the rotor may be South magnetic poles. This arrangement can allow the force for urging the rotation to be produced by the magnetic repulsive force from the outer field magnets 11A to 11F of the outer stator 1 and to be produced by the magnetic attractive force from the inner field magnets 34A to 34F of the inner stator 3, when electricity is applied to the armature sections 22A to 22F of the rotor 2, respectively, to rotate the rotor 2.

Likewise, in the arrangement in which the outer field magnets 11A to 11F are disposed at 30° between the respective field magnets out of the inner field magnets 34A to 34F, the inner field magnets 34A to 34F of the inner stator 3 may be provided with North magnetic poles in the same manner as in the embodiment as shown in FIG. 1. On the other hand, the magnetic poles of the outer field magnets 11A to 11F Of the outer stator 1, directed to the side of the rotor 2, may be provided all with North magnetic poles. In this case, the rotor 2 may be rotated by the force for urging the rotation produced by the magnetic attractive force from the outer field magnets 11A to 11F of the rotor 2 and by the force for urging the rotation produced by the magnetic repulsive force from the inner field magnets 34A to 34F of the inner stator 3.

It is further to be noted herein that the rotary electric machine according to the present invention may be structured such that a coil for generating electricity is mounted to the rotor and the electric current generated from the coil is returned to the motor by the rotation of the rotor to thereby partially drive the motor by the electricity generated by itself. This allows the electricity to be generated by itself by the driving force of the motor. When the rotary electric machine according to the present invention is applied to this kind of the embodiment, it can be employed as a rotary electric machine of a self mobile type.

INDUSTRIAL APPLICABILITY

The present invention can provide a new rotary electric machine based on the new operational principle, which can be operated by the driving force produced by the magnetic repulsive force acting between the magnetic poles of the same polarity of the rotor and stator by the arrangement of the field system constituted by the groups of the magnetic poles of the same polarity.

The rotary electric machine of this type has a great magnitude of output torque so that it may be employed, for example, as a source for generating the driving force for electric automobiles and the like.

I claim:

1. A rotary electric machine comprising:

a hollow outer stator having a plurality of field magnets;

a cylindrical hollow rotor arranged concentrically inside the outer stator with a gap therebetween; and an inner stator arranged concentrically inside said rotor with a gap therebetween, said inner stator having a plurality of field magnets;

wherein the plurality of field magnets of said outer stator are disposed in a spaced relationship along a circumferential direction on its surface directed to said rotor in such a manner that all magnetic poles of said field magnets on the side directed to said rotor have the same polarity;

said rotor is mounted with a plurality of magnetic pole generating means, each including a rotor winding wound on its core, disposed along a circumferential direction on its surface directed to said outer stator, in a spaced relationship in accordance with the position in which said field magnets are disposed;

a commutation mechanism, disposed for exciting a rotor winding of said rotor by a commutator and a brush; and wherein said commutation mechanism is structured such that (A) a rotor winding of said rotor is excited in a direction in which the magnetic pole of said rotor on the side directed to said field magnets generates the same polarity as that of the magnetic pole of said field magnets facing said rotor and that said rotor winding is excited at a timing when a combination of (i) a magnetic repulsive force to be received from a field magnet disposed on the rear side in the rotational direction of said rotor, and (ii) a magnetic repulsive force to be received from the field magnet disposed on the front side in the normal direction thereof turns into a force for urging the rotation of said rotor in its rotational direction, when said rotor winding is excited, because the magnetic repulsive force received from a field magnet disposed on the rear side in the rotational direction of said rotor is greater than the magnetic repulsive force received from the field magnet disposed on the front side in the rotational direction thereof, and (B) the excitation of said rotor winding is suspended at a timing when the rotation of said rotor in the normal direction is decreased because the relationship of the magnetic repulsive forces between the magnetic poles of said rotor and said field magnets is reversed, and wherein the magnetic poles of said rotor on the opposite side of the magnetic poles generated by said magnetic pole generating means are arranged to appear in the circumferential direction on the inside surface of said rotor; and said inner stator is structured such that a plurality of its field magnets are arranged in the circumferential direction on a surface facing said rotor in a spaced relationship in accordance with the position in which the inner magnetic poles of said rotor are disposed and such that the magnetic poles of said field magnets of said inner stator on the side directed to said rotor all have the same polarity which is opposite to the polarity of the magnetic poles of the field magnets of the outer stator on the side directed to said rotor.

2. A rotary electric machine according to claim 1 wherein said magnetic pole generating means comprises a salient pole with said rotor winding wound on the core projecting from a main body side of said rotor into the gap; and said salient pole is arranged such that a front end portion of its head portion forming a magnetic pole extends longer in the rotational direction of said rotor than a rear end portion thereof.

3. A rotary electric machine comprising:

a hollow outer stator having a plurality of magnetic pole generating means for generating magnetic poles on a surface of said outer stator;

a cylindrical hollow rotor arranged concentrically inside the outer stator with a gap therebetween; and an inner stator arranged concentrically inside said rotor with a gap therebetween said inner stator having a plurality of magnetic pole generating means for generating magnetic poles on a surface of said inner stator;

wherein said rotor is arranged with a plurality of field magnets disposed in a spaced relationship along a circumferential direction on its surface directed to said outer stator in such a manner that all magnetic poles of said field magnets on the side directed to said outer stator have the same polarity;

each of said plurality of magnetic pole generating means of said outer stator comprise a stator winding wound on its core, disposed along a circumferential direction on its surface directed to said rotor, in a spaced relationship in accordance with the position in which a field magnet is disposed;

a control mechanism which comprises a position detector for detecting a position of rotation of said rotor and a drive circuit for exciting said outer stator winding in accordance with the position detected by said position detector; and wherein said control mechanism is structured such that said outer stator winding is excited in the direction in which the magnetic pole of said outer stator on the side directed to said field magnet generates the same polarity as that of the magnetic pole of said field magnet facing said outer stator and such that said outer stator winding is excited at a timing when a combination of a magnetic repulsive force to be received by said field magnets of said rotor from the magnetic poles on said outer stator side behind in the rotational direction of said rotor with a magnetic repulsive force to be received thereby from the magnetic poles on said outer stator side ahead in the rotational direction thereof turns into a force for urging the rotation of said rotor in its normal direction, when said outer stator winding is excited, because the magnetic repulsive force received from the magnetic poles on the outer stator side disposed on the rear side in the rotational direction of said rotor is greater than the magnetic repulsive force received from the magnetic poles disposed on the front side in the rotational direction thereof, and the excitation of said outer stator winding is suspended at a timing when the rotation of said rotor in the normal direction is decreased because the relationship of the magnetic repulsive forces between the magnetic poles on the outer stator sides is reversed, and wherein the magnetic poles on the side opposite to the magnetic poles of the field magnets of said rotor are arranged so as to appear in the circumferential direction on the inner surface of said rotor; each of said plurality of said magnetic pole generating means for said inner stator having a stator winding wound on its core, in the circumferential direction on the surface directed to said rotor in a spaced relationship in accordance with the position in which the field magnets of said rotor are disposed; and said electricity-applying control mechanism is structured such that a winding of said inner stator is excited in substantially the same manner as the winding of said outer stator, with the exception that the polarity of the magnetic pole of said inner stator on the side directed to said rotor becomes the same as the polarity of the magnetic poles inside the field magnets of said rotor.

* * * * *